US010243635B2

(12) United States Patent
Hansen et al.

(10) Patent No.: US 10,243,635 B2
(45) Date of Patent: Mar. 26, 2019

(54) METHOD AND APPARATUS FOR BEAMFORMING TRAINING USING FRAMES

(71) Applicant: PERASO TECHNOLOGIES INC., Toronto (CA)

(72) Inventors: Christopher James Hansen, Los Altos, CA (US); Gary Cheng, Unionville (CA); Joseph Andonieh, Aurora (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 69 days.

(21) Appl. No.: 15/643,995

(22) Filed: Jul. 7, 2017

(65) Prior Publication Data

US 2018/0026696 A1    Jan. 25, 2018

Related U.S. Application Data

(60) Provisional application No. 62/365,533, filed on Jul. 22, 2016, provisional application No. 62/417,531, (Continued)

(51) Int. Cl.
*H04B 7/06* (2006.01)
*H01Q 3/26* (2006.01)
(Continued)

(52) U.S. Cl.
CPC ............ *H04B 7/0617* (2013.01); *H01Q 3/26* (2013.01); *H04B 7/0417* (2013.01); (Continued)

(58) Field of Classification Search
None
See application file for complete search history.

(56) References Cited

U.S. PATENT DOCUMENTS

| | | | |
|---|---|---|---|
| 2017/0033844 A1* | 2/2017 | Kasher | H04B 7/0695 |
| 2017/0134076 A1* | 5/2017 | Maamari | H04B 7/0452 |
| 2017/0279507 A1* | 9/2017 | Kim | H04B 17/327 |

OTHER PUBLICATIONS

IEEE Standards Association. (2012). 802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications. Retrieved from http://standards. ieee. org/about/get/802/802.11. html.
(Continued)

*Primary Examiner* — Christine T Duong
(74) *Attorney, Agent, or Firm* — Perry + Currier Inc.

(57) ABSTRACT

A method and apparatus for beamforming training using frames is provided. A device generates a frame comprising header data and beamforming data. The beamforming data is organized into units of beamforming training (TRN) fields. The header data comprises numbers indicating: a first type of TRN fields in each of the units of the beamforming data, to be transmitted using same antenna settings used for the header data; a second type of TRN fields in each of the units to be transmitted using different antenna settings than used for the header data; and how the first type of TRN fields are organized into respective groups of the second type of TRN fields in each of the units that are to be consecutively transmitted using same respective antenna settings, the respective antenna settings changing with each successive group of the third number of the second type of TRN fields.

20 Claims, 11 Drawing Sheets

Related U.S. Application Data filed on Nov. 4, 2016, provisional application No. 62/422,664, filed on Nov. 16, 2016, provisional application No. 62/427,538, filed on Nov. 29, 2016, provisional application No. 62/385,442, filed on Sep. 9, 2016.

(51) Int. Cl.
*H04W 72/04* (2009.01)
*H04W 74/00* (2009.01)
*H04W 48/12* (2009.01)
*H04B 7/0417* (2017.01)
*H04W 16/28* (2009.01)

(52) U.S. Cl.
CPC ......... *H04B 7/0634* (2013.01); *H04B 7/0636* (2013.01); *H04W 16/28* (2013.01); *H04W 48/12* (2013.01); *H04W 72/0446* (2013.01); *H04W 74/002* (2013.01); *H04W 72/046* (2013.01)

(56) References Cited

OTHER PUBLICATIONS

Cordeiro, Carlos. "Specification framework for TGay." IEEE802 (2016): 11-15.

\* cited by examiner

METHOD AND APPARATUS FOR BEAMFORMING TRAINING USING FRAMES

CROSS-REFERENCE TO RELATED APPLICATIONS

This application claims priority from U.S. provisional patent application Nos. 62/365,533 filed Jul. 22, 2016; 62/417,531 filed Nov. 4, 2016; 62/422,664 filed Nov. 16, 2016, and 62/427,538 filed Nov. 29, 2016. The contents of each of the above applications is incorporated herein by reference.

FIELD

The specification relates generally to wireless communications, and specifically to a method and apparatus for a method and apparatus for beamforming training using frames.

BACKGROUND

Wireless communications between sender and receiver stations can be highly directional, especially when the sender and receiver stations communicate according to protocols that use higher frequencies, such as 60 GHz used with the 802.11ad and 802.11ay protocols. As such sender and receiver stations generally include antenna arrays having sectors that can be operated directionally, the sender and receiver stations generally attempt to "train" each other to communicate effectively, for example by using beamforming training ("TRN") fields. However, such beamforming training can be inefficient as it generally occurs in a dedicated beamforming training interval during which payload data, and the like, is not exchanged.

SUMMARY

An aspect of the specification provides a method in a wireless communication assembly of a first wireless communication device configured to perform a beamforming refinement procedure with a second wireless communication device, the method comprising: generating, at a controller of the first wireless communication device, a frame comprising: header data and beamforming data, the beamforming data organized into one or more units of beamforming training (TRN) fields, the header data comprising: a first number ("P") of a first type of TRN fields in each of the one or more units of the beamforming data, the first type of TRN fields to be transmitted using same antenna settings used for the header data; a second number ("M") of a second type of TRN fields in each of the one or more units of the beamforming data, the second type of TRN fields to be transmitted using different antenna settings than used for the header data; and a third number ("N") of the second type of TRN fields organized into a respective group of the second type of TRN fields in each of the one or more units that are to be consecutively transmitted using same respective antenna settings, the respective antenna settings changing with each successive group of the third number ("N") of the second type of TRN fields; the beamforming data further comprising: the one or more units of the TRN fields as defined by the first number, the second number and the third number; and the first number of the first type of TRN fields further appended to a last unit; and transmitting, using a radio of the first wireless communication device, the frame to the second wireless communication device.

Another aspect of the specification provides a wireless communication assembly of a first wireless communication device configured to perform a beamforming refinement procedure with a second wireless communication device, the wireless communication assembly comprising: a controller and a radio, the controller configured to: generate a frame comprising: header data and beamforming data, the beamforming data organized into one or more units of beamforming training (TRN) fields, the header data comprising: a first number ("P") of a first type of TRN fields in each of the one or more units of the beamforming data, the first type of TRN fields to be transmitted using same antenna settings used for the header data; a second number ("M") of a second type of TRN fields in each of the one or more units of the beamforming data, the second type of TRN fields to be transmitted using different antenna settings than used for the header data; and a third number ("N") of the second type of TRN fields organized into a respective group of the second type of TRN fields in each of the one or more units that are to be consecutively transmitted using same respective antenna settings, the respective antenna settings changing with each successive group of the third number ("N") of the second type of TRN fields; the beamforming data further comprising: the one or more units of the TRN fields as defined by the first number, the second number and the third number; and the first number of the first type of TRN fields further appended to a last unit; and transmit, using the radio, the frame to the second wireless communication device.

Another aspect of the specification provides a method in a wireless communication assembly of a first station configured to perform a beamforming refinement procedure with a second station, the method comprising: generating a data frame comprising (i) header data; (ii) payload data; and (iii) beamforming data, the beamforming data consisting of: (a) at least one training field containing a plurality of complementary sequences; and (b) for each training field, a cyclic extension field containing a portion of the training field contents; and sending the data frame to the second station.

Another aspect of the specification provides a method in a wireless communication assembly of a first station configured to perform a beamforming refinement procedure with a second station, the method comprising: generating a data frame comprising (i) header data; (ii) payload data; and (iii) beamforming data, the beamforming data consisting of: (a) a plurality of training fields each containing a plurality of complementary sequences, the length of each training field selected based on at least one of a bandwidth parameter and a number of antenna streams; (b) a plurality of additional channel estimation fields distributed amongst the training fields at a configurable interval spacing; and sending the data frame to the second station.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
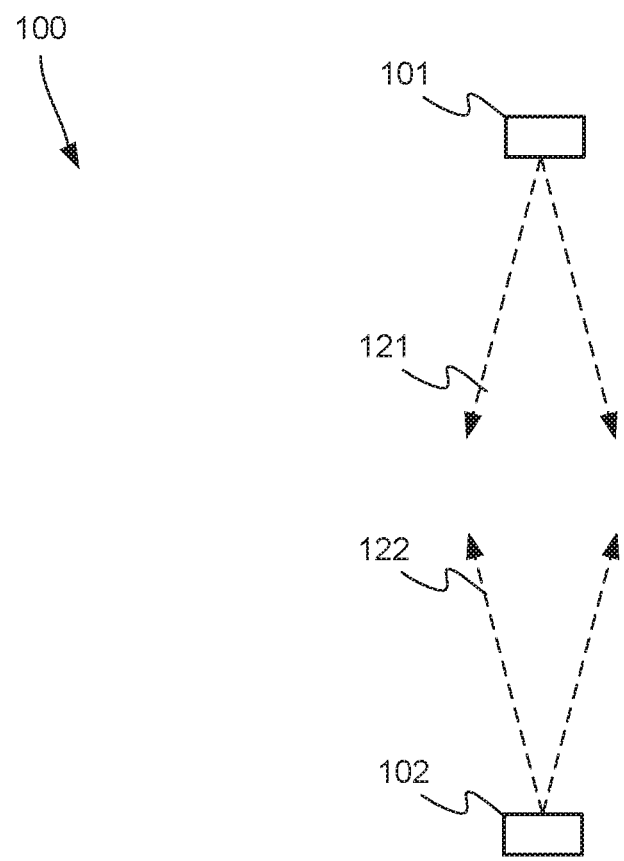
FIG. 1 depicts a wireless communications system, according to non-limiting implementations.

FIG. 1 depicts a wireless communications system 100, including a wireless service set that includes wireless communication devices 101 and 102 that are in communication with each other using respective beams 121, 122. The nature and population of the service set is not particularly limited. As will be apparent to those skilled in the art, the service set of the system 100 may be a personal basic service set (PBSS) consisting of at least a pair of wireless communication devices (e.g. devices 101, 102) in communication with each other. In other examples, the service set may be a basic service set (BSS) such as an infrastructure BSS including an access point (e.g. at least one of the devices 101, 102 is an access point) or an independent BSS.

It is assumed, in the system 100, that the devices 101, 102 are each using a same and/or similar frequency to communicate. For example, the devices shown in FIG. 1 may each be implementing the IEEE 802.11ad (WiGig) standard or enhancements thereof (e.g. 802.11ay, alternatively referred to as EDMG (Enhanced Directional Multi-Gigabit), and therefore all transmit and receive data at frequencies around 60 GHz. Hence, the beams 121, 122 each include data transmitted at, or around, 60 GHz. At such frequencies, the beams 121, 122 are highly susceptible to interference from structures between the devices 101, 102 (e.g. buildings, etc., not depicted). The devices 101, 102 are therefore configured to perform certain actions to refine the direction of the beams 121, 122 and/or improve communications therebetween, which can lead to a decrease in their susceptibility to interference, for example by performing beamforming training of respective antenna arrays using frames. The devices 101, 102 may alternatively be referred to as stations.

Each of the devices 101, 102 can comprise one or more of a mobile device or a non-mobile device, which includes, but is not limited to, any suitable combination of electronic devices, communication devices, computing devices, portable electronic devices, wireless adapters, wireless USB (Universal Serial Bus) adapters, mobile computing devices, portable computing devices, tablet computing devices, laptop computers, PDAs (personal digital assistants), cellphones, smartphones, e-readers, mobile camera devices, personal computers, work stations, access points, servers, media servers, telephones, and the like. Indeed, any device that communicates wirelessly and which can perform beamforming training (e.g. and hence includes an antenna array) is within the scope of present embodiments.

Figure 2:
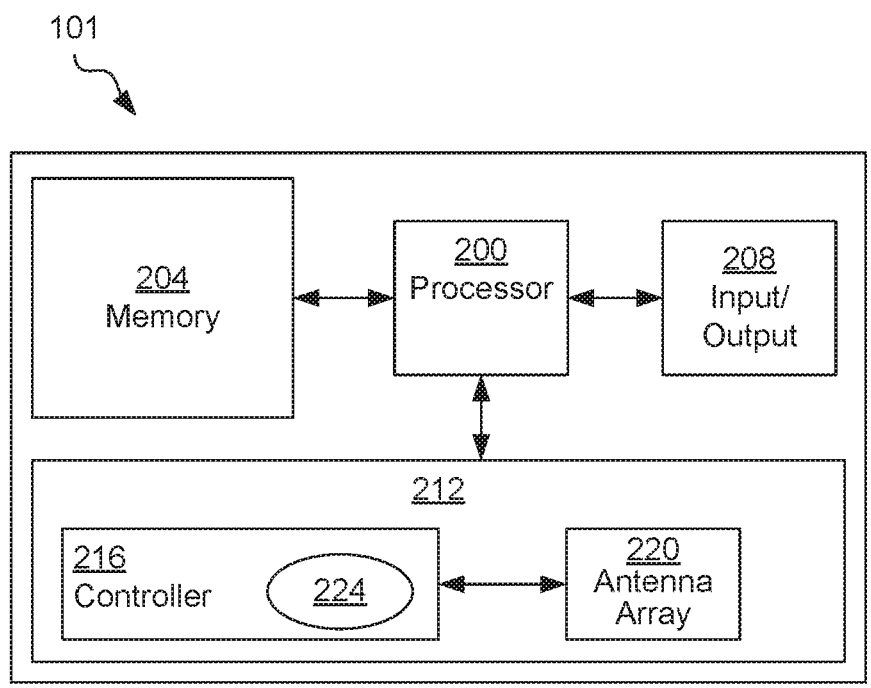
FIG. 2 depicts a block diagram of a device of the system of FIG. 1, according to non-limiting implementations.

Turning now to FIG. 2, before describing the operation of the devices of the system 100 to implement the beamforming training functionality mentioned above, certain components of the device 101 will be described. The description of the device 101 below also applies to the device 102. That is, the devices 101, 102 each include the components discussed below, though it will be understood that the particular implementation of each component may vary from device to device.

The device 101 includes a central processing unit (CPU), also referred to as a processor 200. The processor 200 is interconnected with a non-transitory computer readable storage medium, such as a memory 204, having stored thereon various computer readable instructions for performing various actions. The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 101 may optionally include one or more input devices, and one or more output devices, generally indicated as an optional input/output device 208. The input and output devices 208 serve to receive commands for controlling the operation of the device 101 and for presenting information, e.g. to a user of the device 101. The input and output devices 208 therefore include any suitable combination of devices, including a keyboard, a mouse, a display, a touchscreen, a speaker, a microphone, and the like). However, for example, in devices such as a wireless USB adapter, an access point, and the like, the input/output device 208 may not be present.

The device 101 further includes a wireless communications assembly 212 interconnected with the processor 200. The assembly 212 enables the device 101 to communicate with other communication devices, for example the device 102. In the present example, the assembly 212 enables such communication according to the IEEE 802.11ad standard (and/or the IEEE 802.11ay standard), and thus transmits and receives data at frequencies of around 60 GHz.

The communications assembly 212 includes a controller 216 in the form of one or more integrated circuits and/or logic circuits, configured to establish and maintain communications links with other devices.

The controller 216 is also configured to process outgoing data for transmission via an antenna array 220, which includes, but is not limited to, a phased array of antenna elements and/or antenna sectors, and to receive incoming transmissions from the array 220 and process the transmissions for communication to the processor 200. The controller 216, in the present example, may therefore include a baseband processor and a transceiver (also referred to as a radio processor), which may be implemented as distinct hardware elements or integrated on a single circuit, including, but not limited to, integrated circuits and/or logic circuits.

Example integrated circuits and/or logic circuits include one or more processors, one or more microprocessors, one or more ASIC (application-specific integrated circuits) and one or more FPGA (field-programmable gate arrays). In some embodiments, the controller 216 is not a generic controller, but a controller specifically configured to implement beamforming training functionality. For example, in some embodiments, the controller 216 specifically comprises a computer executable engine configured to implement specific beamforming training functionality.

Further, the controller 216 is configured to execute various computer-readable instructions (e.g. stored in a memory element integrated with the controller 216 or implemented as a discrete hardware component of the assembly 212 and connected with the controller 216) for performing the above functions. Further, the controller 216 is configured to execute a beamforming training application 224, also referred to herein as the application 224. Via the execution of the application 224, the controller 216 is configured to operate the wireless communications assembly 212 to: generate a frame comprising: header data and beamforming data, the beamforming data organized into units of beamforming training (TRN) fields, the header data comprising: a first number ("P") of a first type of TRN fields in each of the units of the beamforming data, the first type of TRN fields to be transmitted using same antenna settings used for the header data; a second number ("M") of a second type of TRN fields in each of the units of the beamforming data, the second type of TRN fields to be transmitted using different antenna settings than used for the header data; and a third number ("N") of the second type of TRN fields organized into a respective group of the second type of TRN fields in each of the units that are to be consecutively transmitted using same respective antenna settings, the respective antenna settings changing with each successive group of the third number ("N") of the second type of TRN fields; the beamforming data further comprising: the units of the TRN fields as defined by the first number ("P"), the second number ("M") and the third number ("N"); and the first number ("P") of the first type of TRN fields appended to a last unit; and transmitting, using a radio and/or the array 220, the frame to the second wireless communication device 102.

The array 220 generally comprises a phased antenna array which produces the beam 121. In general, the array 220 may be operated in one or more modes, including, but not limited to: an omni (and/or a quasi-omni) mode in which the beam 121 has a transmission angle of 360° (and/or over all directions over which the array 220 is configured to transit); and a directional mode in which the beam 121 is narrowed in one or more directions, for example towards the device 102, as depicted in FIG. 1. Indeed, the controller 216 is generally configured to implement the application 224 to: narrow the beam 121 more precisely in the direction of the device 102; and/or to improve communications therebetween. Similarly, the controller of the device 102 is configured to: narrow the beam 122 more precisely in the direction of the device 101; and/or to improve communications therebetween.

Figure 3:
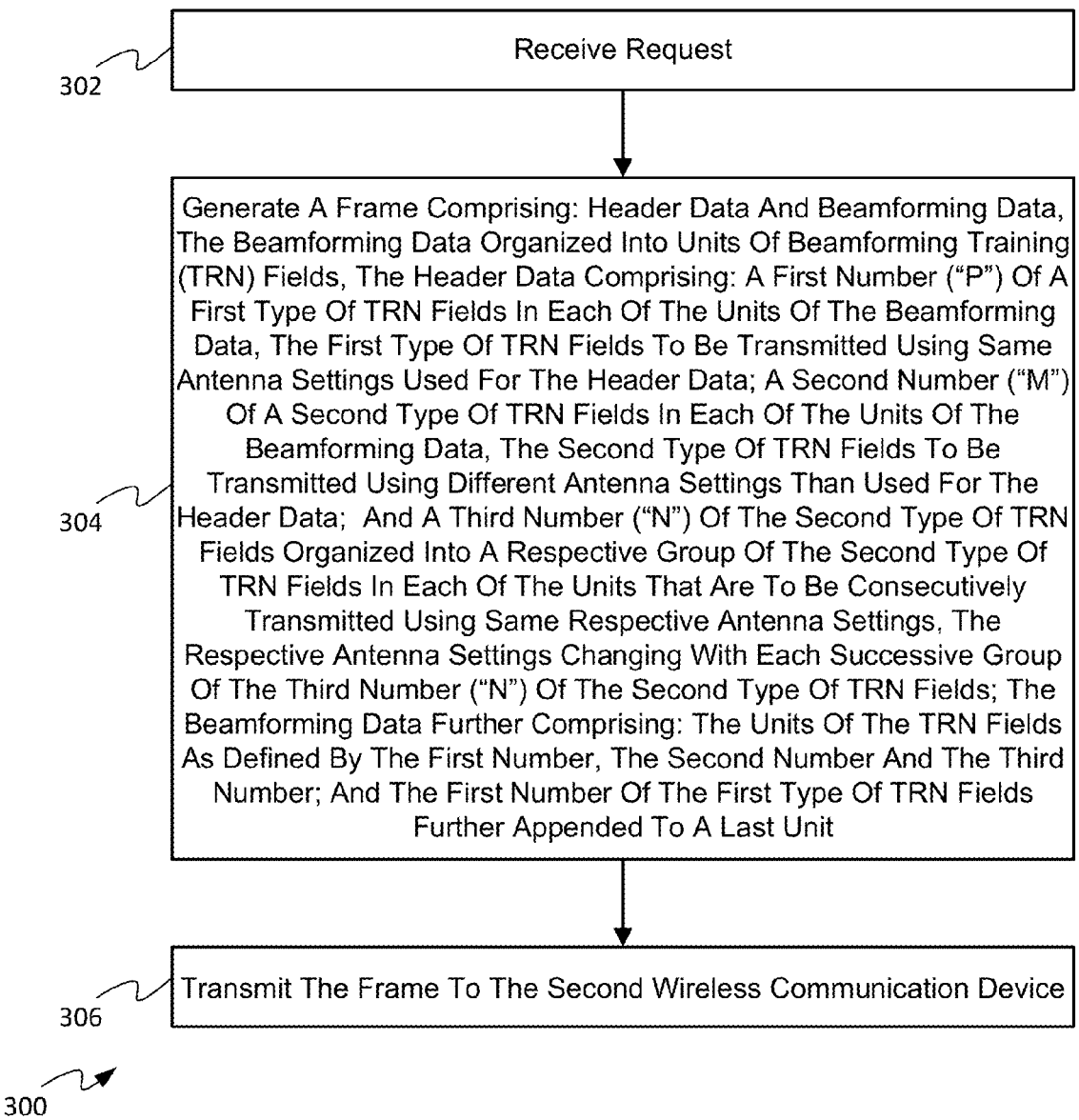
FIG. 3 depicts a flowchart of a method for beamforming training in the system of FIG. 1, according to non-limiting implementations.

Attention is now directed to FIG. 3, which depicts a flowchart of a method 300 for beamforming training using frames, according to non-limiting implementations. In order to assist in the explanation of method 300, it will be assumed that method 300 is performed using system 100, and specifically by controller 216 of device 101, for example when controller 216 processes application 224. Indeed, method 300 is one way in which system 100 and/or device 101 and/or controller 216 can be configured. Furthermore, the following discussion of method 300 will lead to a further understanding of device 101, and system 100 and its various components. However, it is to be understood that system 100 and/or device 101 and/or controller 216 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well. Furthermore, while computing device 101 is described as implementing and/or performing each block of method 300, it is appreciated that each block of method 300 occurs using controller 216 processing application 224.

It is assumed in the method 300 that the device 101 has exchanged service set credentials with the device 102 (such as respective service set identifiers, and the like), and that the beam 121 is generally directed towards the device 102, and similarly that the beam 122 is generally directed towards the device 101. For example, prior to the implementation of the method 300, one or more of devices 101, 102 may have been broadcasting a respective service set identifier in an omni (and/or quasi-omni) mode of a respective array 220. When a respective service set identifier was received and/or a response to a transmission of a respective service set identifier was received, each of the devices 101, 102 switched to communicating therebetween using a directional mode of a respective array 220 forming the beams 121, 122 (e.g. using a portion of antenna elements and/or sectors of the respective arrays 220). The portion of the respective arrays 220 used to form the beams 121, 122 can be based on one or more sectors of the respective arrays 220 where data (e.g. a service set identifier) was initially received while the respective arrays 220 were operated in the omni (and/or quasi-omni) mode.

At an optional block 302, the controller 216 receives a request from the device 102, for example within the beam 122. The request can be for a frame, and the like, including, but not limited to, one or more of a data frame, a control frame and a management frame. Alternatively, the request can comprise a BRP (Beam Refinement Protocol) request, and the like, which defines how the device 102 is to perform beamforming training. Either way, the request can include beamforming parameters, as described below, that instruct the device 101 how to perform beamforming training using frames.

At a block 304, the controller 216 generates a frame comprising: header data and beamforming data, the beamforming data organized into units of beamforming training (TRN) fields, the header data comprising: a first number ("P") of a first type of TRN fields in each of the units of the beamforming data, the first type of TRN fields to be transmitted using same antenna settings used for the header data; a second number ("M") of a second type of TRN fields in each of the units of the beamforming data, the second type of TRN fields to be transmitted using different antenna settings than used for the header data; and a third number ("N") of the second type of TRN fields organized into a respective group of the second type of TRN fields in each of the units that are to be consecutively transmitted using same respective antenna settings, the respective antenna settings changing with each successive group of the third number ("N") of the second type of TRN fields; the beamforming data further comprising: the units of the TRN fields as defined by the first number ("P"), the second number ("M") and the third number ("N"); and the first number ("P") of the first type of TRN fields appended to a last unit.

At a block 306, the controller 216 transmits, using a radio and/or the array 220, the frame to the second wireless communication device 102. For example, each TRN field in the frame is transmitted using associated antenna settings.

In particular, the frame includes beamforming training fields, as described hereafter, that enable the devices 101, 102 to operate their respective arrays 220 to more precisely direct beams 121, 122 towards each other.

Method 300 will now be described with reference to FIG. 4 to FIG. 11.

Figure 4:
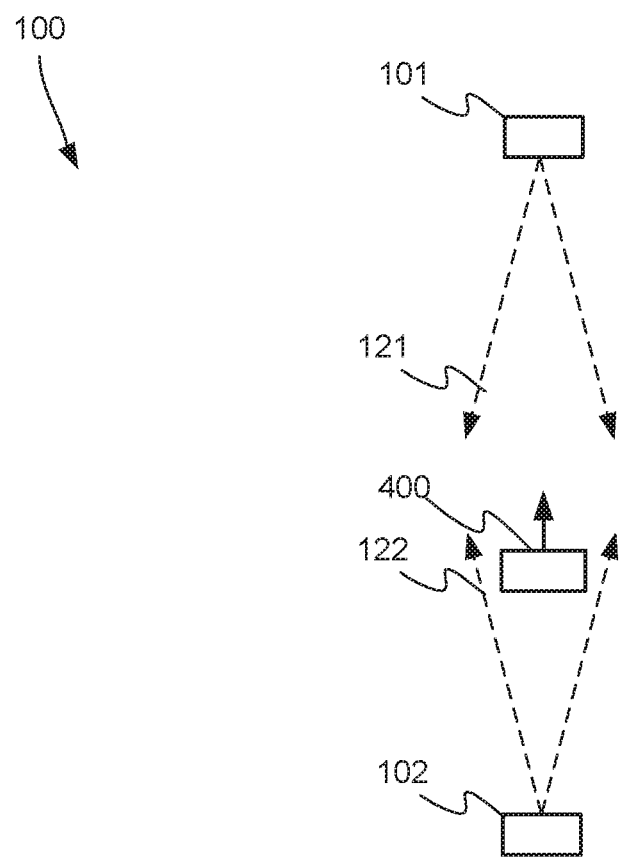
FIG. 4 depicts a request being transmitted between the devices of the system of FIG. 1, according to non-limiting implementations.

Attention is next directed to FIG. 4, which depicts a non-limiting implementation of the block 302. FIG. 4 is substantially similar to FIG. 1, with like elements having like numbers. In FIG. 4, the device 101 is depicted transmitting a request 400 in the beam 122, which is received, at the device 101, for example at the block 302. Example structure and/or data of the request 400 will be described in further detail below. However, the request 400 hence may generally include beamforming parameters which may include, but is not limited to, the numbers P, M, and N, described below. The request 400 may be generated when the respective controller 216 of the device 102 is implementing the respective application 224 and/or an application for generating the request 400.

Figure 5:
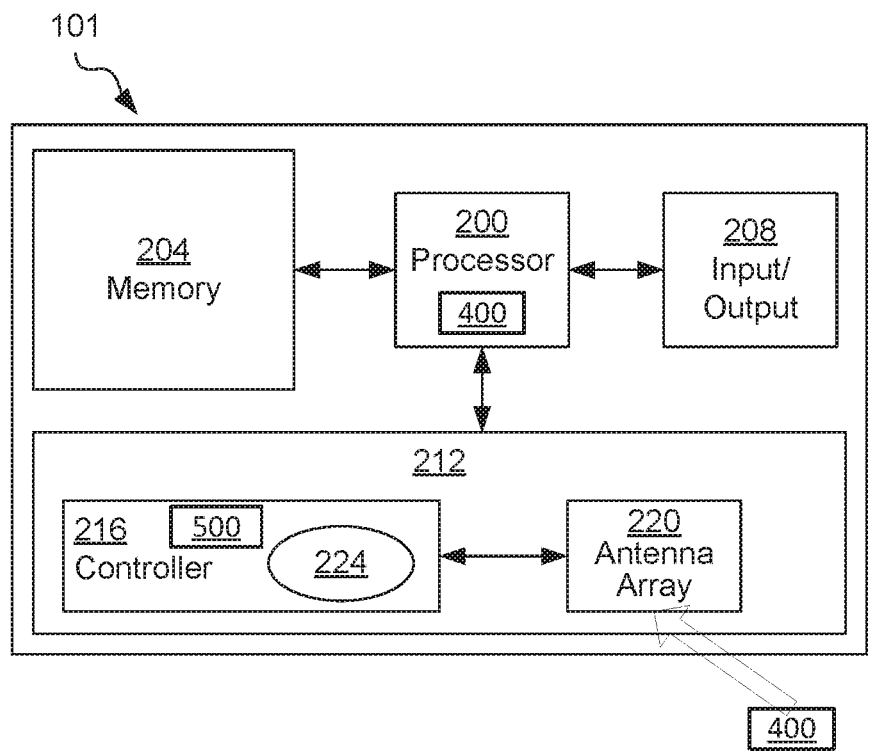
FIG. 5 depicts the device of FIG. 2 generating a frame, according to non-limiting implementations.

Attention is next directed to FIG. 5, which depicts a non-limiting implementation of the block 304. FIG. 5 is substantially similar to FIG. 2, with like elements having like numbers. In FIG. 5, the controller 216 is depicted generating a frame 500, for example in response to receiving the request 400. As depicted the request 400 is being received at the array 220 and optionally being processed by the processor 200 to extract, for example, information used to generate the frame 500 (e.g. the numbers P, M, and N, described below).

The frame 500 may comprise one of a control frame, a data frame, and a management frame, as understood by persons of skill in the art, for example persons having knowledge of 802.11 protocols.

Figure 6:
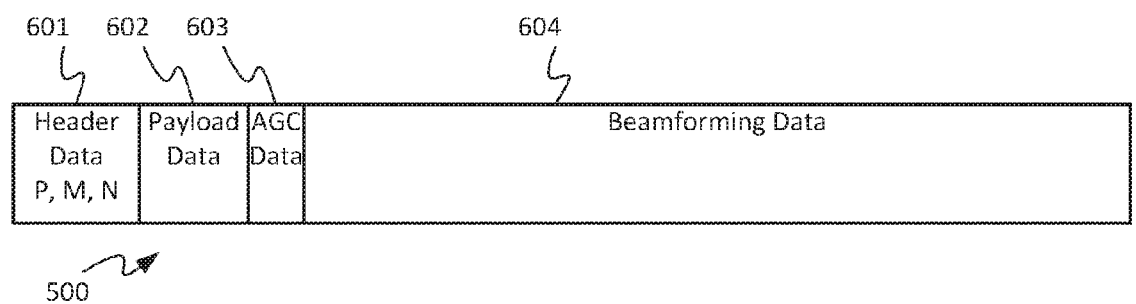
FIG. 6 depicts the frame of FIG. 5, according to non-limiting implementations.

Attention is next directed to FIG. 6 which depicts a non-limiting implementation of the frame 500 generated by the device 101 when implementing the application 224.

The frame 500 includes header data 601, payload data 602 (e.g. data to be received at the device 102, for example packets including one or more of text data, image data, audio data, video data, browser data, and the like), optional AGC (automatic gain control) fields 603, and beamforming data 604. As will be described below, the header data 601 comprises values which define a structure of the beamforming data 604 including, but not limited to, a first number "P", a second number "M" and a third number "N".

The frame 500 may further include other headers. For example, in some implementations, the frame 500 is defined by the 802.11ay standard where frames include an L-Header, an EDMG-Header-A1, and a EDMG-Header-A2. In these implementations, the header data 601 may be a portion of the EDMG-Header-A1. Similarly, the frame 500 may have any other type of format and/or include any other data and/or information that also includes the header data 601, and the beamforming data 604.

Figure 7:
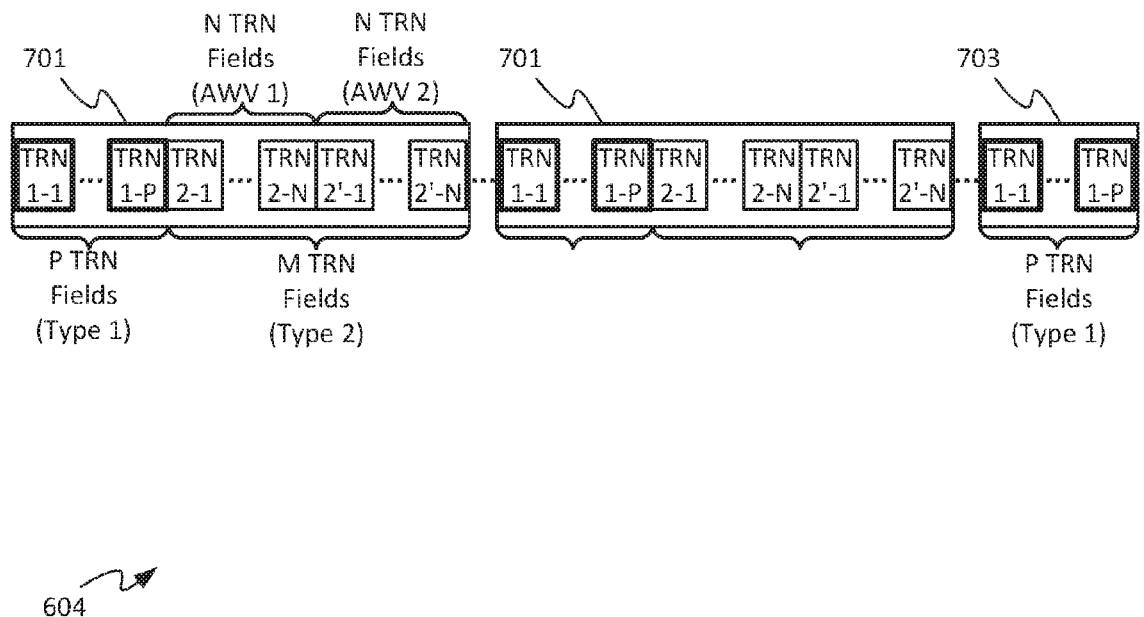
FIG. 7 depicts beamforming data of the frame of FIG. 5, according to non-limiting implementations.
Figure 8:
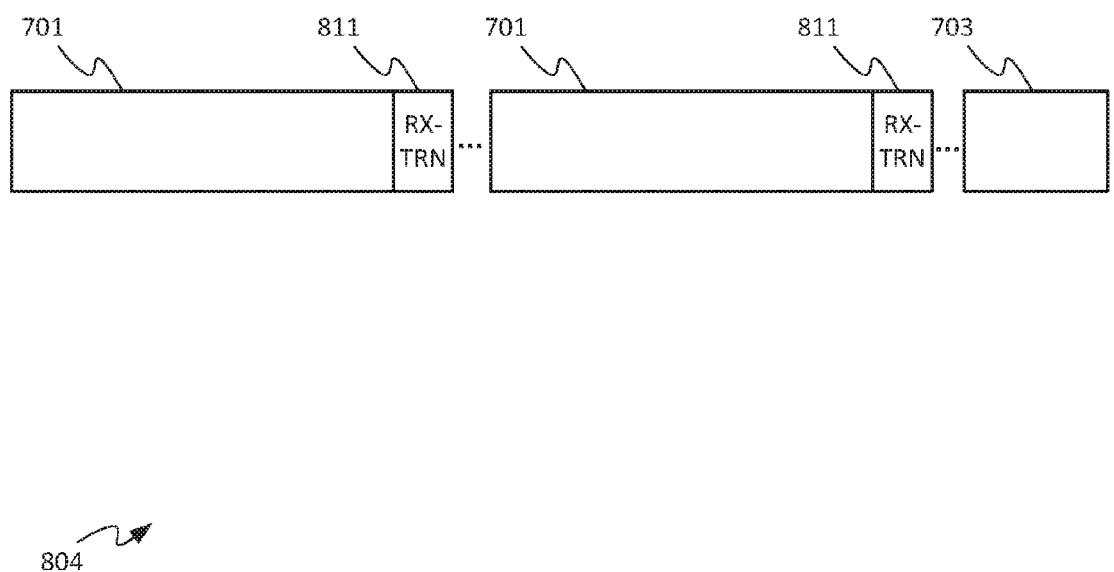
FIG. 8 depicts alternative beamforming data of the frame of FIG. 5, according to non-limiting implementations.

Attention is next directed to FIG. 7 which depicts the beamforming data 604. As depicted, the beamforming data 604 is organized into a plurality of units 701, each of the units 701 comprising a set of the number "P" of a first type of beamforming training (TRN) fields followed by a set of the number "M" of a second type TRN fields.

Each of the TRN fields comprise one or more complementary sequences, including, but not limited to, Golay sequences and the like.

Further, each of the TRN fields is associated with antennas settings that are to be used to transmit a respective TRN field. The associated antenna settings may include, but are not limited to: a phase of the array 220, elements and/or sectors of the array 220 that are to be used to transmit a TRN field, an antenna wave vector ("AWV"), a frequency that is to be used to transmit a TRN field, and the like.

For example, the first type of TRN fields are to be transmitted using the array 220 using the same antenna settings as used for the header data 601, for example the same antenna settings used to form the beam 121. The first type of TRN fields may be alternatively referred to as channel estimation fields.

The second type of TRN fields are to be transmitted using different antenna settings than used for the header data 601, for example, to change one or more of: a phase of the array 220, sectors of the array 220 that are to be used to transmit a TRN field, an AWV, a frequency that is to be used to transmit a TRN field, and the like. The second type of TRN fields are hence to be transmitted to the device 102 using antenna settings that are perturbations of the antenna settings used to transmit the header data 601 and/or the first type of TRN fields; as such, as each of the second type of TRN fields, the beam 121 may change, for example with respect to direction, frequency and the like.

The set of the "M" number of the second type of TRN fields for each unit 701 are further organized into groups of "N" TRN fields, where each group of "N" TRN fields are to be consecutively transmitted using same respective antenna settings, but where the respective antenna settings change with each successive group. Put another way, each successive group of N TRN fields are transmitted with one or more of a different antenna wave vector and a different frequency than a previous group of N TRN fields. For example, as depicted the group of TRN fields 2-1 . . . 2-N are transmitted with same respective antenna settings, while the next group of TRN fields 2'-1 . . . 2'-N are transmitted using a different antenna settings. Hence, each group of "N" TRN fields represent a different perturbation of the antenna settings of the header data 601 and/or the first type of TRN fields.

Hence, the set of the number "M" of the second type of TRN fields (e.g. that follow the set of the first type of TRN fields in each unit 701) is an integer number of "N".

Furthermore, while each unit 701 is similarly depicted in FIG. 7, each set of the M TRN fields in each of the units 701 may be associated with different antenna settings.

However, in some implementations, a given number of consecutive units 701 may be associated with the same set of antenna settings (e.g. the antenna settings for each set of the M TRN fields in the given number of consecutive units 701 may be the same from consecutive unit 701 to consecutive unit 701). Indeed, such consecutive units 701 may be used by the device 102 to perform receive beamforming training.

As depicted, the beamforming data 604 further includes a last set of "P" TRN fields 703 of the first type appended to the last unit 701.

Hence, when the frame 500 is transmitted, the header data 601, the payload data 602 and the AGC fields 603 (if present) are transmitted using the same antenna settings, and then the beamforming data 604 is transmitted using perturbations of the antenna settings represented by the "M" TRN fields of the second type in each unit 701. As the "M" TRN fields of the second type in each unit 701 are received at the device 102, the device 102 may measure a quality parameter, and the like, of each of the M" TRN fields of the second type in each unit 701, and provide feedback to the device 101. The device 101 may received this feedback on each of the M" TRN fields of the second type in each unit 701, and adjust the beam 121 to improve the directionality and/or the communication between the devices 101, 102.

The "P" TRN fields of the first type in each unit 701, and the "P" TRN fields 703 at the end of the beamforming data 604 being transmitted may be used by the device 102 as a calibration of against which to measure the quality parameter, and the like, of the "M" TRN fields which follow and/or precede the "P" TRN fields.

Furthermore, as the second type of TRN fields represent perturbations of the initial antenna settings used to transmit the header data 601 and/or the first type of TRN fields, the second type of TRN fields may alternatively referred to as transmit TRN fields.

Hence, the header data 401 defines the structure of the beamforming data 604 by including in the header data 401: a first number ("P") of the first type of TRN fields in each of the sets of the first type of TRN fields; a second number ("M") of the second type of TRN fields that follow each of the sets of the first type TRN fields, other than the last set of the first type of TRN fields; and a third number ("N") of the first type of TRN fields in a respective group of the first type of TRN fields, in each of the sets of the first type TRN fields, that are to be consecutively transmitted using same respective antenna settings and the respective antenna settings change with each successive group.

In some implementations, the beamforming data 604 may further include a third type of TRN field, for example receive TRN fields, which are all associated with same antenna settings which may be similar or different from the antennas settings of the header data 601 and/or the first type of TRN fields. Hence, the antenna settings for the third type of TRN field may be identical. For example, attention is next directed to FIG. 8 which depicts alternative beamforming data 804 which may be used in the frame 500 in place of the beamforming data 604. The beamforming data 804 is similar to the beamforming data 604 but includes receive TRN fields 811, which the device 102 may receive using perturbations of its respective antenna settings, measure a quality parameter thereof, and which may be used to adjust the beam 122. As depicted, the receive TRN fields 811 are appended to the end of each unit 701, but the receive TRN fields 811 may be inserted, for example as a group, at any suitable position in the beamforming data 804, including, but not limited to after the last unit 701 and/or after the P TRN fields 703.

Furthermore, in some implementations, for example, where the numbers "P", "M" and "N" are specified in implementations where communications between the devices 101, 102 occur according to the 802.11ay standard (e.g. EDMG), a value of P may be selected from 0, 1, 2, or 4, a value of M may be selected from 1 to 16 (inclusive), and a value of N may be selected from 1, 2, 3, 4 or 8. As such, the numbers "P", "M" and "N" may be specified in an EDMG-Header-A1, and 2 bits can be dedicated to specifying the number P, 4 bits can be dedicated to specifying the number M, and 2 bits can be dedicated to specifying the number N.

In other words, in some implementations, where P=0, the units 701 do not include the TRN fields of the first type, and neither is the last set of "P" TRN fields 703 of the first type appended to the last unit 701.

Furthermore, in implementations where communications between the devices 101, 102 occur according to the 802.11ay standard, respective values for each of P, M and N may comprise one of: P=2, M=6, N=3; or P=2, M=8, N=1. Indeed, these two sets of P, M and N may represent two mandatory default modes of the devices 101, 102. However, after the devices 101, 102 are in communication with each other (e.g. and form an association), the devices 101, 102 may optionally negotiate the values of P, M and N based on their respective capabilities For example, the values of each of the numbers "P", "M" and "N" may be negotiated depending on the capabilities and/or the processing resources, and the like of the device 102. For example, the processor 200, the controller 216, the antenna array 220, of the device 102 may be require that N be greater than 1 in order to perform an adequate quality measurement as TRN fields of the second type are received in the frame 500.

For example, one or more of the devices 101, 102, may send their transmit and/or receive capabilities to the other of the devices 101, 102 in form of fields populated with values that represent their respective transmit and/or receive capabilities. Furthermore, the fields may be filtered based on the transmit and/or receive capabilities of the other device 101, 102. For example, if the device 101 is not capable of transmitting "P" TRN fields of the first type per unit 701, and the device 102 is capable of receiving "P" TRN fields of the first type per unit 701, the device 102 may not inform of the device 101 of such capability. In other words, once one of the devices 101, 102 has an indication of the capabilities of the other device, the device 101, 102 that has received the indication of the capabilities of the other device may inform the other device only of its compatible capabilities.

Table 1 and Table 2 below provide a non-limiting example of bitfields that may be used by each of the devices 101, 102 to populate indications of transmit and/or receive capabilities which are transmitted to the other device. For example, the values of the bitfields described in Table 1 and Table 2 may be carried in an EDMG (Enhanced Directional Multi-Gigabit) Capabilities field assuming the devices 101, 102 are operating according to the EDMG standard, and may be present in one or more of announce frames, association request frames, association response frames, reassociation request frames, reassociation response frames, probe request frames and probe response frames, and may also be present in one or more of DMG beacon frames, information request frames, and information response frames. The Table 1 shows transmit capability bit fields, while the Table 2 shows receive capability bit fields.

TABLE 1

| Field | Bits | Description |
|---|---|---|
| TP0 | 1 | Device capable of transmitting with P = 0 |
| TP1 | 1 | Device capable of transmitting with P = 1 (e.g. Each unit includes 1 TRN-T of the first type) |
| TP4 | 1 | Device capable of transmitting with P = 4 (e.g. Each unit includes 4 TRN-T of the first type) |
| TN2 | 1 | Device capable of transmitting with N = 2 (e.g. Each unit includes AWV/antenna settings repeated over 2 TRN-T of the second type) |
| TN4 | 1 | Device capable of transmitting N = 4 (e.g. Each unit includes AWV/antenna settings repeated over 4 TRN-T of the second type) |
| TN8 | 1 | Device capable of transmitting N = 8 (e.g. Each unit includes AWV/antenna settings repeated over 8 TRN-T of the second type) |

TABLE 2

| Field | Bits | Description |
|---|---|---|
| RP0 | 1 | Device capable of receiving with P = 0 |
| RP1 | 1 | Device capable of receiving with P = 1 (e.g. Each unit includes of 1 TRN-T of the first type) |
| RP4 | 1 | Device capable of receiving with P = 4 (e.g. Each unit includes of 4 TRN-T of the first type) |
| RN2 | 1 | Device capable of receiving with N = 2 (e.g. Each unit includes AWV/antenna settings repeated over 2 TRN-T of the second type) |
| RN4 | 1 | Device capable of receiving N = 4 (e.g. Each unit includes AWV/antenna settings repeated over 4 TRN-T of the second type) |
| RN8 | 1 | Device capable of receiving N = 8 (e.g. Each unit includes AWV/antenna settings repeated over 8 TRN-T of the second type) |

In any event, the values of each of the numbers "P", "M" and "N" to be used to generate the frame 500 may be included in the request 400. Similarly, a number of units 701 to be transmitted in the frame 500 may also be included in the request 400, as well as a number of consecutive units 701 which are to be repeated using the same set of TRN settings.

For example, in EDMG implementations, the request 400 can include, but is not limited to:

An 8 bit "L-RX" value, which specifies a number of units 701 to be transmitted in the frame 500, the "L-RX" value being selected from 1-255, inclusive.

An 8 bit "TX/RX" value, which specifies a number of consecutive units 701 to be transmitted in the frame 500 using the same respective antenna settings (as described above).

A 2 bit value of P selected from 1, 2, or 4.

A 4 bit value of M selected from 1-16 (inclusive).

A 2 bit value of N selected from 1, 2, 3, 4 or 8.

Furthermore, the value of N may depend on a number of channels being used to communicate between the devices 101, 102, the value of N increasing as the number of channels increase. For example, in EDMG, the number of channels may be between 1 and 4, inclusive, and the value of N (and hence also M) may be increased such that each grouping of N TRN fields may be used for beamforming training on different channels.

Figure 9:
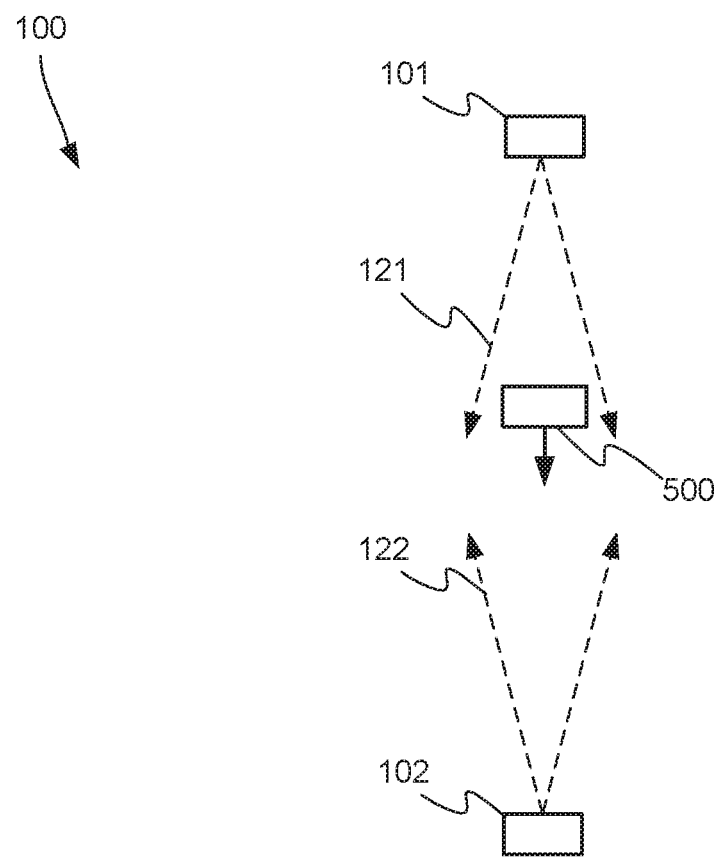
FIG. 9 depicts the frame being transmitted between the devices of the system of FIG. 1, according to non-limiting implementations.
Figure 10:
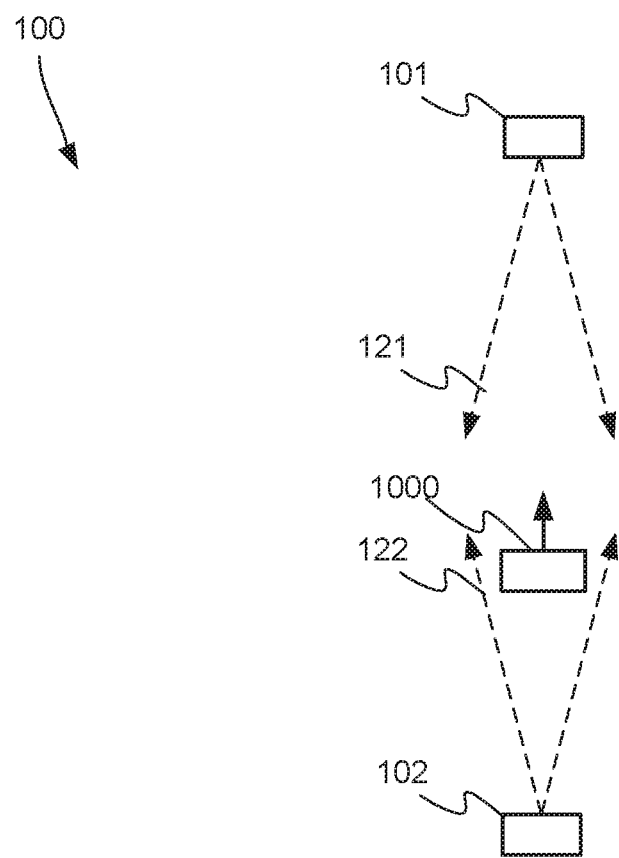
FIG. 10 depicts feedback to the frame being transmitted between the devices of the system of FIG. 1, according to non-limiting implementations.
Figure 11:
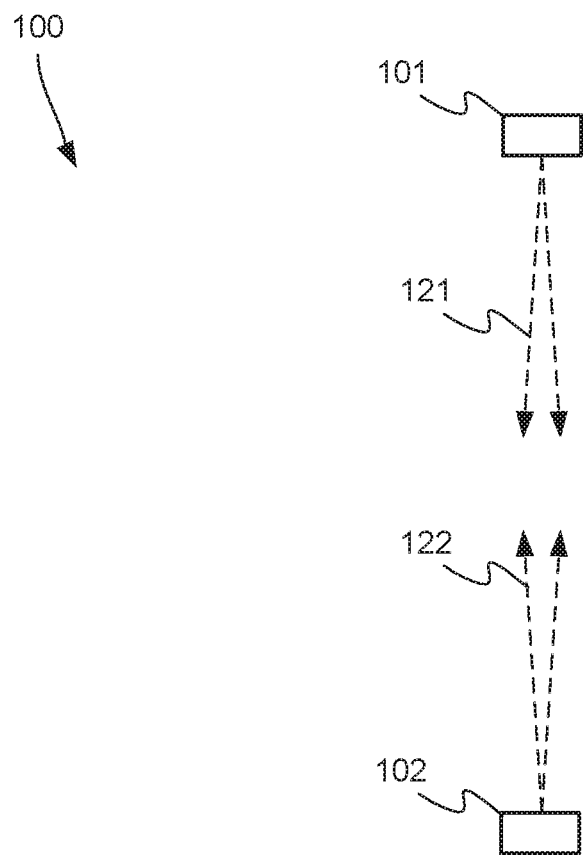
FIG. 11 depicts the devices of the system of FIG. 1 adjusting communications therebetween, according to non-limiting implementations.

Attention is next directed to FIGS. 9, 10 and 11, each of which are substantially similar to FIG. 4, with like elements having like numbers. FIG. 9 which depicts a non-limiting implementation of the block 306 of the method 300 in which the frame 500 is transmitted to the device 102, for example in the beam 121, and in response to the request 400. As described above, each TRN field in the frame 500 is transmitted using the respective antenna settings. The frame 500 is received at the device 102. As such, the data in the payload 602 is delivered, for example to the processor 200 of the device 102.

Furthermore, as each of TRN fields in the frame 500 are received, the device 102 measures a quality parameter, and the like and, as depicted in FIG. 10, transmits feedback 1000 to the device 101. The feedback 1000 may generally includes a determined quality parameter (including but not limited to one or more of an RSSI (Received Signal Strength Indicator), error indicators, and the like) for at least a portion of the TRN fields received in the frame 500 such that the device 101 may determine, using the feedback 1000, which antenna settings resulted in the best communication between the devices 101, 102. As depicted in FIG. 11, the device 101 may then adjust the beam 121 based on the feedback 1000 to be, for example and as depicted, more directional towards the device 102 and/or to improve communications with the device 102. Such adjustment may include changing the antenna settings, as described above, used to generate the beam to antenna settings associated with TRN field in the frame 500 the best quality parameter received in the feedback 1000.

When the frame 500 includes receive TRN fields (and/or consecutive units 701 as specified using the "TX/RX" value), the device 102 may also vary its antenna settings when receiving the receive TRN fields (and/or the consecutive units 701 as specified using the "TX/RX" value). Hence, as depicted in FIG. 11, based on the feedback 1000, the device 102 also adjusts the beam 122 to be more directional and/or to improve communications with the device 101.

It is furthermore appreciated that the beamforming training that occurs as a result of the frame 500 does not occur within a dedicated beamforming interval prior to the exchange of payload data between the devices 101, 102. Rather, beamforming training occurs in conjunction with exchange of payload data.

Hence, described herein are methods and apparatus where beamforming training using frames. The frames may include a payload such that beamforming training may occur during exchange of data between the devices and not during a dedicated beamforming training interval, which can be more efficient than performing beamforming training during a dedicated beamforming training interval.

Those skilled in the art will appreciate that in some implementations, the functionality of devices 101, 102 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 102 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method in a wireless communication assembly of a first wireless communication device configured to perform a beamforming refinement procedure with a second wireless communication device, the method comprising:
   generating, at a controller of the first wireless communication device, a frame comprising: header data and beamforming data,
      the beamforming data organized into one or more units of beamforming training (TRN) fields,
      the header data comprising: a first number ("P") of a first type of TRN fields in each of the one or more units of the beamforming data, the first type of TRN fields to be transmitted using same antenna settings used for the header data; a second number ("M") of a second type of TRN fields in each of the one or more units of the beamforming data, the second type of TRN fields to be transmitted using different antenna settings than used for the header data; and a third number ("N") of the second type of TRN fields organized into a respective group of the second type of TRN fields in each of the one or more units that are to be consecutively transmitted using same respective antenna settings, the respective antenna settings changing with each successive group of the third number ("N") of the second type of TRN fields;
      the beamforming data further comprising: the one or more units of the TRN fields as defined by the first number, the second number and the third number; and the first number of the first type of TRN fields further appended to a last unit; and
   transmitting, using a radio of the first wireless communication device, the frame to the second wireless communication device.

2. The method of claim 1, wherein the second number ("M") of the second type of TRN fields follow the first number ("P") of the first type of TRN fields in each of the one or more units.

3. The method of claim 1, wherein the frame is generated according to a request received from the second wireless communication device, the request comprising the first number, the second number and the third number.

4. The method of claim 3, wherein the request further includes a requested number of the one or more units.

5. The method of claim 1, wherein the second number ("M") is an integer multiple of the third number ("N").

6. The method of claim 1, wherein the second type of TRN fields comprise transmit TRN fields.

7. The method of claim 1, wherein the frame further includes a third type of TRN fields, the third type of TRN fields comprising receive TRN fields.

8. The method of claim 1, wherein respective values for each of P, M and N comprise one of: P=2, M=6, N=3; or P=2, M=8, N=1.

9. The method of claim 1, wherein the frame comprises one of a control frame, a data frame, and a management frame.

10. The method of claim 1, further comprising negotiating values of the first number, the second number and the third number with the second wireless communication device.

11. A wireless communication assembly of a first wireless communication device configured to perform a beamforming refinement procedure with a second wireless communication device, the wireless communication assembly comprising:
   a controller and a radio, the controller configured to:
      generate a frame comprising: header data and beamforming data,
         the beamforming data organized into one or more units of beamforming training (TRN) fields,
         the header data comprising: a first number ("P") of a first type of TRN fields in each of the one or more units of the beamforming data, the first type of TRN fields to be transmitted using same antenna settings used for the header data; a second number ("M") of a second type of TRN fields in each of the one or more units of the beamforming data, the second type of TRN fields to be transmitted using different antenna settings than used for the header data; and a third number ("N") of the second type of TRN fields organized into a respective group of the second type of TRN fields in each of the one or more units that are to be consecutively transmitted using same respective antenna settings, the respective antenna settings changing with each successive group of the third number ("N") of the second type of TRN fields;
         the beamforming data further comprising: the one or more units of the TRN fields as defined by the first number, the second number and the third number; and the first number of the first type of TRN fields further appended to a last unit; and
      transmit, using the radio, the frame to the second wireless communication device.

12. The wireless communication assembly of claim 11, wherein the second number ("M") of the second type of TRN fields follow the first number ("P") of the first type of TRN fields in each of the one or more units.

13. The wireless communication assembly of claim 11, wherein the frame is generated according to a request received from the second wireless communication device, the request comprising the first number, the second number and the third number.

14. The wireless communication assembly of claim 13, wherein the request further includes a requested number of the one or more units.

15. The wireless communication assembly of claim 11, wherein the second number ("M") is an integer multiple of the third number ("N").

16. The wireless communication assembly of claim 11, wherein the second type of TRN fields comprise transmit TRN fields.

17. The wireless communication assembly of claim 11, wherein the frame further includes a third type of TRN fields, the third type of TRN fields comprising receive TRN fields.

18. The wireless communication assembly of claim 11, wherein respective values for each of P, M and N comprise one of: P=2, M=6, N=3; or P=2, M=8, N=1.

19. The wireless communication assembly of claim 11, wherein the frame comprises one of a control frame, a data frame, and a management frame.

20. The wireless communication assembly of claim 11, wherein the controller is further configured to negotiate values of the first number, the second number and the third number with the second wireless communication device.

* * * * *